(12) United States Patent
Pereira et al.

(10) Patent No.: US 10,282,173 B2
(45) Date of Patent: May 7, 2019

(54) SYSTEM AND OPTIMIZATION METHOD FOR OIL PROGRAMMING IN A REFINERY THROUGH LINEAR GENETIC PROGRAMMING AND GRAMMAR-ORIENTED PROGRAMMING, AND READABLE STORAGE MEDIUM

(71) Applicant: PETROLEO BRASILEIRO S.A.—PETROBRAS, Rio de Janeiro, RJ (BR)

(72) Inventors: Cristiane Salgado Pereira, Rio de Janeiro (BR); Douglas Mota Dias, Rio de Janeiro (BR); Marco Aurelio Cavalcanti Pacheco, Rio de Janeiro (BR)

(73) Assignee: PETROLEO BRASILEIRO S.A.—PETROBRAS, Rio de Janeiro (BR)

(*) Notice: Subject to any disclaimer, the term of this patent is extended or adjusted under 35 U.S.C. 154(b) by 308 days.

(21) Appl. No.: 14/972,406

(22) Filed: Dec. 17, 2015

(65) Prior Publication Data

US 2016/0231993 A1 Aug. 11, 2016

(30) Foreign Application Priority Data

Feb. 6, 2015 (BR) .................... 10 2015 002628-5

(51) Int. Cl.
*G06F 9/44* (2018.01)
*G06F 8/35* (2018.01)
(Continued)

(52) U.S. Cl.
CPC ............... *G06F 8/35* (2013.01); *G06F 8/31* (2013.01); *G06F 9/455* (2013.01)

(58) Field of Classification Search
CPC ........................................ G06F 8/31
See application file for complete search history.

(56) References Cited

U.S. PATENT DOCUMENTS

| | | | |
|---|---|---|---|
| 6,442,513 B1* | 8/2002 | Cheng | G06F 17/10 700/27 |
| 2006/0184254 A1* | 8/2006 | Carpency | F25J 3/0219 700/30 |

(Continued)

*Primary Examiner* — Philip Wang
(74) *Attorney, Agent, or Firm* — Sughrue Mion PLLC

(57) ABSTRACT

The present invention is related to production schedules in a refinery and, more particularly, refinery production schedules by genetic programming in domain specific language. In this scenario, the present invention provides a method and an optimization system based on linear genetic programming oriented to grammar and with quantic inspiration using a domain specific language for the solution of oil programming problems, in addition to a readable medium comprising instructions to perform this said method. More specifically, the quantic chromosome keeps the superposition of states of all possible solutions and, through the evolutionary process and observation of quantic genes, the classical chromosome is created as a linear sequence of instructions to be performed. The performed instructions represent the scheduling. The orientation of this process is made through the use of a multiple-goal competence function that ranks evaluations about the operation time of the distillation units, the time for unloading ships, the use of the pipeline that moves oil between the terminal and the refinery, as well as factors such as the number of tanks exchanges and use of injection tanks in the distillation units.

13 Claims, 8 Drawing Sheets

(51) Int. Cl.
*G06F 8/30* (2018.01)
*G06F 9/455* (2018.01)

(56) References Cited

U.S. PATENT DOCUMENTS

| | | | |
|---|---|---|---|
| 2010/0131250 A1* | 5/2010 | Carpency | G06Q 10/04 703/2 |
| 2016/0042074 A1* | 2/2016 | Mu | G06F 19/70 707/710 |
| 2016/0195506 A1* | 7/2016 | Kumar | G01N 33/2811 702/50 |

* cited by examiner

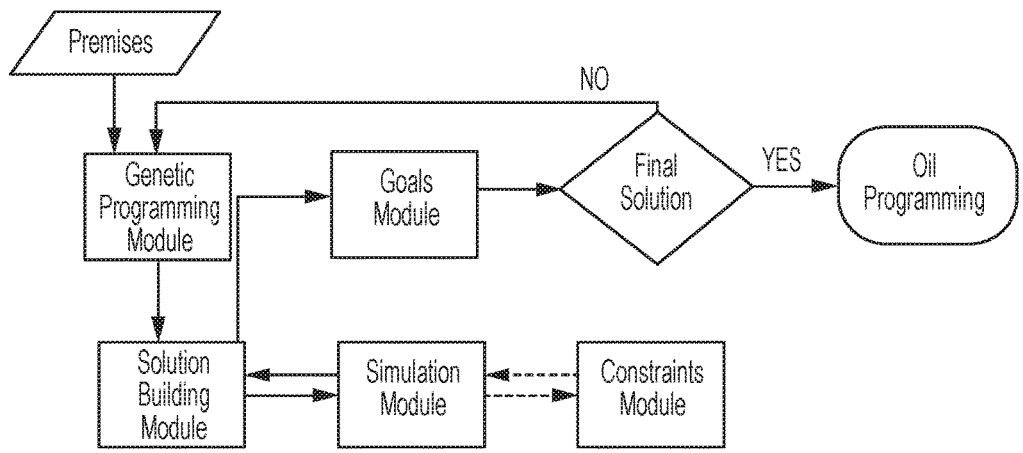

FIG. 1

```
S              ::= <func>
<func>         ::= <header>
<header>       ::= float "myfunction(float x) {" <body> "}"
<body>         ::= <declarations> <code> <return>
<declarations> ::= "float a"
<return>       ::= "return(a)"
<code>         ::= <line> | <line> <code>
<line>         ::= <var> "=" <expr>
<expr>         ::= <expr> <op> <expr> | <pre-op> "(" <expr> ")" |
                   <var>
<op>           ::= "+" | "-" | "/" | "*"
<pre-op>       ::= "sin" | "cos" | "tan" | "log"
<var>          ::= "x"
```

FIG. 2

```
float myfunction(float x)
{
    a = x + sin(x)
    return(a)
}
```

FIG. 3

```
<func>   ::=  "NOp" |
              "RcvItemMax"     <navioeTnq> <tnqT> |
              "RcvItemProp"    <navioeTnq> <tnqT> <itemProp> |
              "FeedCDUMax"     <tnqR> <uda>
              "FeedCDUProp"    <tnqR> <uda> <feedProp> |
              "FeedCDUMaxInj"  <tnqR> <tnqInj> <injProp> <uda>|
              "FeedCDUPropInj" <tnqR> <tnqInj> <injProp> <feedProp> <uda>|
              "PipeTransfMax"  <tnqT> <tnqR> |
              "PipeTransfProp" <tnqT> <tnqR> <pipeProp>

<navioeTnq>  ::= "navio1" <navio1Tanq> | "navio2" <navio2Tanq>
<navio1Tanq> ::= "tanq1" | "tanq2"
<navio2Tanq> ::= "tanq1"
<tnqT>       ::= "TqT01" | "TqT02" | "TqT03" | "TqT04"
<tnqR>       ::= "TqR01" | "TqR02" | "TqR03" | "TqR04"
<tnqInj>     ::= "TqR01" | "TqR02" | "TqR03" | "TqR04"
<uda>        ::= "UDA-01" | "UDA-02"
<itemProp>   ::= "0.1"|"0.2"|"0.3"|"0.4"|"0.5"|"0.6"|"0.7"|"0.8"|"0.9"
<pipeProp>   ::= "0.2"|"0.4"|"0.6"|"0.8"
<feedProp>   ::= "0.2"|"0.4"|"0.5"|"0.6"|"0.8"
<injProp>    ::= "0.1"|"0.2"|"0.3"|"0.4"|"0.5"
```

FIG. 4

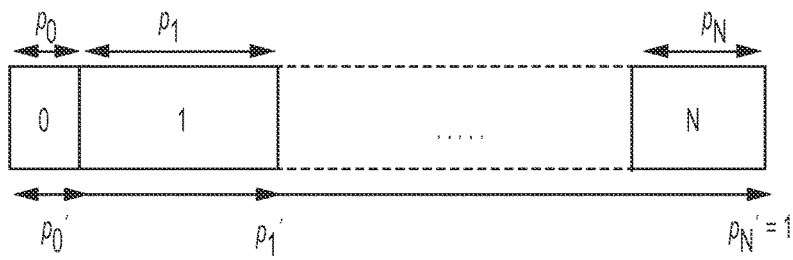

FIG. 5

$$T(r) = \begin{cases} 0, & \text{se } 0 \leq r < p_0' \\ 1, & \text{se } p_0' \leq r < p_1' \\ \vdots \\ N, & \text{se } p_{N-1}' \leq r < p_N' \end{cases}$$

FIG. 6

| 0 | | 0,336 | 0,347 | | 0,937 | 0,948 | 0,958 | 0,969 | 0,979 | 0,990 |
|---|---|---|---|---|---|---|---|---|---|---|
| | 0 | 1 | 2 | | 3 | 4 | 5 | 6 | 7 | 8 |
| | $p_{NOp}$ | $p_{RcvltMax}$ | $p_{RcvltPr}$ | | $p_{FdCduMax}$ | ... | $p_{FdCduMaxly}$ | ... | | $p_{PipeTrProp}$ |

FIG. 7

| | \<func\> | |
|---|---|---|
| TF | Prob | Name |
| 0 | $p_0'$ | Nop |

| | | | TnqT | | | shipAndTank | | | | |
|---|---|---|---|---|---|---|---|---|---|---|
| | | | TT | Prob | Content | navio1 | | | navio2 | |
| | | | | | | TT | Prob | Name | TT | Prob | Content |
| 1 | $p_1'$ | RcvItemMax | 0 | $p_0'$ | TqT01 | 0 | $p_0'$ | tanq1 | 0 | $p_0'$ | tanq1 |
| | | | 1 | $p_1'$ | TqT02 | 1 | $p_1'$ | tanq2 | | | |
| | | | 2 | $p_2'$ | TqT03 | | | | | | |
| | | | 3 | $p_3'$ | TqT04 | | | | | | |

| | | | TnqT | | | shipAndTank | | | | | itemProp | | |
|---|---|---|---|---|---|---|---|---|---|---|---|---|---|
| | | | TT | Prob | Content | navio1 | | | navio2 | | TT | Prob | Content |
| | | | | | | TT | Prob | Content | TT | Prob | Content | | | |
| 2 | $p_2'$ | RcvItemProp | 0 | $p_0'$ | TqT01 | 0 | $p_0'$ | tanq1 | 0 | $p_0'$ | tanq1 | 0 | $p_0'$ | 0.1 |
| | | | 1 | $p_1'$ | TqT02 | 1 | $p_1'$ | tanq2 | | | | 1 | $p_1'$ | 0.2 |
| | | | 2 | $p_2'$ | TqT03 | | | | | | | 2 | $p_2'$ | 0.3 |
| | | | 3 | $p_3'$ | TqT04 | | | | | | | 3 | $p_3'$ | 0.4 |
| | | | | | | | | | | | | 4 | $p_4'$ | 0.5 |
| | | | | | | | | | | | | 5 | $p_5'$ | 0.6 |
| | | | | | | | | | | | | 6 | $p_6'$ | 0.7 |
| | | | | | | | | | | | | 7 | $p_7'$ | 0.8 |
| | | | | | | | | | | | | 8 | $p_8'$ | 0.9 |

| | | | TnqR | | | uda | | | |
|---|---|---|---|---|---|---|---|---|---|
| | | | TT | Prob | Content | TT | Prob | Content |
| 3 | $p_3'$ | FeedCDUMax | 0 | $p_0'$ | TqR01 | 0 | $p_0'$ | UDA-01 |
| | | | 1 | $p_1'$ | TqR02 | 1 | $p_1'$ | UDA-02 |
| | | | 2 | $p_2'$ | TqR03 | | | |
| | | | 3 | $p_3'$ | TqR04 | | | |

| | | | TnqR | | | uda | | | feedProp | | |
|---|---|---|---|---|---|---|---|---|---|---|---|
| | | | TT | Prob | Content | TT | Prob | Content | TT | Prob | Content |
| 4 | $p_4'$ | FeedCDUProp | 0 | $p_0'$ | TqR01 | 0 | $p_0'$ | UDA-01 | 0 | $p_0'$ | 0.2 |
| | | | 1 | $p_1'$ | TqR02 | 1 | $p_1'$ | UDA-02 | 1 | $p_1'$ | 0.4 |
| | | | 2 | $p_2'$ | TqR03 | | | | 2 | $p_2'$ | 0.5 |
| | | | 3 | $p_3'$ | TqR04 | | | | 3 | $p_3'$ | 0.6 |
| | | | | | | | | | 4 | $p_4'$ | 0.8 |

FIG. 9

| | | | TnqR | | | uda | | | injProp | | | | |
|---|---|---|---|---|---|---|---|---|---|---|---|---|---|
| | | TT | Prob | Content | TT | Prob | Content | TT | Prob | Content | | | |
| | | 0 | $p_0'$ | TqR01 | 0 | $p_0'$ | UDA-01 | 0 | $p_0'$ | 0.1 | | | |
| 5 | $p_5'$ FeedCDUMaxInj | 1 | $p_1'$ | TqR02 | 1 | $p_1'$ | UDA-02 | 1 | $p_1'$ | 0.2 | | | |
| | | 2 | $p_2'$ | TqR03 | | | | 2 | $p_2'$ | 0.3 | | | |
| | | 3 | $p_3'$ | TqR04 | | | | 3 | $p_3'$ | 0.4 | | | |
| | | | | | | | | 4 | $p_4'$ | 0.5 | | | |

| | | | TnqR | | | uda | | | feedProp | | | injProp | |
|---|---|---|---|---|---|---|---|---|---|---|---|---|---|
| | | TT | Prob | Content | TT | Prob | Content | TT | Prob | Content | TT | Prob | Content |
| | | 0 | $p_0'$ | TqR01 | 0 | $p_0'$ | UDA-01 | 0 | $p_0'$ | 0.2 | 0 | $p_0'$ | 0.1 |
| 6 | $p_6'$ FeedCDUPropInj | 1 | $p_1'$ | TqR02 | 1 | $p_1'$ | UDA-02 | 1 | $p_1'$ | 0.4 | 1 | $p_1'$ | 0.2 |
| | | 2 | $p_2'$ | TqR03 | | | | 2 | $p_2'$ | 0.5 | 2 | $p_2'$ | 0.3 |
| | | 3 | $p_3'$ | TqR04 | | | | 3 | $p_3'$ | 0.6 | 3 | $p_3'$ | 0.4 |
| | | | | | | | | 4 | $p_4'$ | 0.8 | 4 | $p_4'$ | 0.5 |

| | | | TnqT | | | TnqR | | | | | | | |
|---|---|---|---|---|---|---|---|---|---|---|---|---|---|
| | | TT | Prob | Content | TT | Prob | Content | | | | | | |
| | | 0 | $p_0'$ | TqT01 | 0 | $p_0'$ | TqR01 | | | | | | |
| 7 | $p_7'$ PipeTransfMax | 1 | $p_1'$ | TqT02 | 1 | $p_1'$ | TqR02 | | | | | | |
| | | 2 | $p_2'$ | TqT03 | 2 | $p_2'$ | TqR03 | | | | | | |
| | | 3 | $p_3'$ | TqT04 | 3 | $p_3'$ | TqR04 | | | | | | |

| | | | TnqT | | | TnqR | | | pipeProp | | | | |
|---|---|---|---|---|---|---|---|---|---|---|---|---|---|
| | | TT | Prob | Content | TT | Prob | Content | TT | Prob | Content | | | |
| | | 0 | $p_0'$ | TqT01 | 0 | $p_0'$ | TqR01 | 0 | $p_0'$ | 0.2 | | | |
| 8 | $p_8'$ PipeTransfProp | 1 | $p_1'$ | TqT02 | 1 | $p_1'$ | TqR02 | 1 | $p_1'$ | 0.4 | | | |
| | | 2 | $p_2'$ | TqT03 | 2 | $p_2'$ | TqR03 | 2 | $p_2'$ | 0.6 | | | |
| | | 3 | $p_3'$ | TqT04 | 3 | $p_3'$ | TqR04 | 3 | $p_3'$ | 0.8 | | | |

FIG. 9 continued

SYSTEM AND OPTIMIZATION METHOD FOR OIL PROGRAMMING IN A REFINERY THROUGH LINEAR GENETIC PROGRAMMING AND GRAMMAR-ORIENTED PROGRAMMING, AND READABLE STORAGE MEDIUM

INVENTION FIELD

The present invention is related to oil production programming in a refinery. More particularly, the present invention is related to production programming in a refinery by genetic programming in domain specific language.

THE BASIS OF THE INVENTION

The production programming can be understood as the definition of what each step of production must run, broken down into many activities of small periods of time, that together, can reach several shifts of operation or even some weeks. Each operating activity must have its inputs and outputs defined both from the material point of view (volumes, flow rates, compositions, properties) and the temporal point of view, i.e. with associated events or start and end dates.

The scheduling—set of all activities associated with the handling and processing of oil that occur within the scope of the refinery's decision—is the central part of the structure of support to the operational decision, since it is a complex activity that encompasses the acquisition, coordination and interpretation of a large volume of data, a financial strategy and the solution of difficult combinatorial problems.

Although the programming horizon can be from a few days to a few weeks, the activities set for the short term has greater importance in the evaluation of programming. This behavior reflects the unstable nature of information handled in the activity, which means that a large part of the activities expected in a medium term has high probability of not happening, either due to variations in conditions of receiving raw materials, in the processing, in the need to meet the demand of products, in logistics or operational issues. The natural finding of these features is that the production planning needs to be redone daily, taking as its starting point the updated information about what is happening or expected to happen.

More specifically, the production planning is characterized by the need to take a large number of decisions daily, dealing with continuous and batch operations. This feature combined with the scarcity of optimization solutions that solve real problems in an efficient manner, that is, considering most of the necessary decision variables to the programmer, make the generation of an operationally feasible solution to be the main activity approach.

The production programmer needs to react to both the variability of the process and of the business and should be able to predict the consequences of deviations from planned activities. One of the goals of the programming is to be able to identify potential crisis situations (for example, low stock) before they happen and try to avoid them.

Programmers integrate information from different sources. They need to know the stock levels and current properties of products, production levels, availability of equipment, expectation of receipt of raw material, logistics handling and forecasts for delivery of products. They need to know how the different process units interact and be familiar with the limitations of load flow, yields, processing times, batch size and any other parameters that represent efficiency, economy or physical constraints for the production process with which they work. The effort to manipulate and combine all this information requires a long period of time, leaving little time for optimization analysis and the decision-making process itself.

Often, an important metric in a scheduling problem is the deviation of the planning, which should be minimized. It is expected that there are degrees of freedom inherent in the decision-making level of programming due to the dynamic nature of the operations, such as demurrage of ships, sequencing of the pumping, of modes of operation, composition of cargo, use of tanking and utilities, among others, that should be considered and, somehow, optimized. These issues are not dealt with at the level of planning.

Some of the types of activities for which the production programming decisions need to be taken are listed below by way of example:

Definition of campaign and load flow of units on a daily basis;
Receiving and sending items;
Transfers between the equipment;
Preparation and circulation of products in tanks; and
Equipment maintenance.

Given the complex nature of the problems of production programming, characterized by the large number of variables, non-linearity and restrictions, for many years the development of solvers for production programming problems based on optimization, was restricted to minor and simplified problems, not corresponding to the real problems of a Brazilian refinery.

Considering the fact that the oil industry handles billions of dollars annually in an environment where often the margins are reduced, it is reasonable to admit that solutions that improve the decision-making processes should translate into increased profitability for the industry and, therefore, represent potential interest to the organizations.

Several papers can be found in the literature that present solution techniques for specific aspects of the production planning problem or that provide solutions to problems carefully defined. Several of these have applied mathematical programming techniques, usually of Mixed-Integer Linear Programming—MILP) or Mixed-Integer Nonlinear Programming—MINLP).

In the document entitled "*Técnicas de Otimização Inteira Mista para o Planejamento e Programação de Produção em Refinarias de Petróleo*" (MORO, L. F. L. Tese de Doutorado. Universidade de São Paulo, São Paulo. 2000) a work is presented in which the oil programming problem is related to an oil refinery that receives oil through a pipeline, some oil tanks and a distillation unit to evaluate the discrete and continuous approaches of time modeling. The first tests were performed only on the quantitative issue and assuming various simplifications so that the MILP modeling was compatible. Among these simplifications, the time slot size, defined as 8 hours, makes it into restrictive modeling, because it impacts the dynamics of the activity decisions. A second evaluation was performed with continuous representation of time where time intervals are defined taking as reference the events of receiving oil, known a priori. In these tests the impact of continuous representation of time has already been noticed by the significant decrease in the number of binary variables, which allowed discretization of non-linear relations and kept the linear problem. Then, an assessment was performed using the same continuous representation of time, but this time, processing of the properties of the chains kept it as a MINLP optimization problem, solved using a suitable solver for this type of problem. In this work it was not considered the quality of oil or restrictions for loading the unit, neither the production of derivatives in the unit.

In the document entitled "*Refinery Scheduling*" (MAGALHÃES, M. V. O. Tese de Doutorado. Imperial College, London. 2004) a work is presented in which the author has developed a formulation with continuous representation of time to propose the schedule whose scope is a terminal, an oil pipeline and some processing units of a refinery. The problem was broken down into two subsystems: programming of oil and programming of products, and the second case treated with Mixed-Integer Linear Programming (MILP). For the programming problem of oil that, when treated with all its restrictions, is a MINLP formulation, the decomposition technique was used was used in order to obtain good results in reasonable computation time. Continuous and discrete approaches were evaluated to address the time. The properties of a mixture of oil were addressed indirectly, through limits of compositions of oils. This approach showed interesting results in the cases applied.

In the document entitled "*Global optimization for scheduling refinery crude oil operations*" (KARUPPIAH, r.; FURMAN, K. C.; GROSSMANN, i.e. Computers & Chemical Engineering, v. 32, n. 11, pp. 2745-2766, Nov. 2008) a work is presented in which the authors proposed a model with continuous representation of time to solve the scheduling involving receipt of oil, storage tanks for these chains, transfer of these tanks to cargo tanks, and load for distillation units. The modeling considered restrictions of ballast and tank capacity, no concurrent operation of inlet and outlet flow in the same tank, exclusive relationship between the cargo tank and the distillation unit, in addition to ensuring volumetric and components balance. The proposed solution was a variation of the outer approximation algorithm (Outer-Approximation). Lower and upper limits were generated for a search space of the original problem, which were then used in the convergence of the model. To obtain the lower limit, the original problem was broken down into areas in which MILP relaxation are used. The upper limit was obtained by solving the non-linear programming problem (Nonlinear Programming—NLP) generated by fixing the original problem binary variables in the value calculated in the relaxed problem. In this model mixtures and properties for the storage tanks were not considered.

In the document entitled "*Short-Term Schedulability Analysis of Multiple Distiller Crude Oil Operations in Refinery With Oil*" (WU, N.; CHU, F.; CHU, C.; ZHOU, M. Analysis, v. 39, n. 1, p. 1-16, 2009) there is a work where the authors have proposed an approach based on process control theory for the short-term scheduling. The methodology used, modeled after the Petri net, is based on the consideration that the scheduling is a set of operating decisions that lead the plant from one state to another, where every decision of operation acts as a controller command. If the new state violates any restrictions making scheduling unfeasible, it is called an "unsafe state" and the decision of the operation that originated it cannot be performed. The solution consists of several operation decisions that keeps the plant between "safe states". The study performed has validated the methodology proposed that works with continuous time modeling and considers the representation of time for preparation in tanks, but assumes the existence of at least 3 cargo tanks for each distillation unit and heavily penalizes the mixture of oil in the tanks. The work demonstrated that the quantity and capacity of cargo tanks, the volume of different oils present in them, the flow of the pipeline and the processing load affect the definition of the "safe state".

In the document titled "*Scheduling of loading and unloading of crude oil in a refinery using event-based discrete time formulation*" (SAHARIDIS, G. K. D.; MINOUX, M.; DALLERY, Y. Ind. Computers and Chemical Engineering, n.33, p. 1413-1426. 2009) a work is presented in which the authors modeled the receipt of oil in the tanks of the refinery through pipeline connected directly to ships. Volumetric balance were modeled in the pipelines and tanks, as well as balance by component in each tank. Continuous representation was used for time and cutting planes to decrease processing time. However, the process unit defines the need of oils that it demands, which is not always possible in operational reality.

It is the consensus of several authors that the representation of time is one of the greatest challenges for precise mathematical representation of the scheduling problems. Models with discrete representation are relatively easy to implement and ensure the integrity of the volumetric balance. However, for accuracy in the representation of activities it requires the definition of a small time interval, which leads to the generation of many breaks in the scheduling period and, consequently, very large and computationally time-consuming models to solve. Whereas the models with continuous representation of time are smaller because they have freedom to set the duration of each activity interval. However, its challenge is to pre-determine the number of intervals that the programming horizon will have.

Another major challenge in the oil programming scenario is the capacity to handle variations in the composition and properties of the mixtures of oil. The modeling of these characteristics implies an overload of equations, the introduction of non-linearity, which compromises the computing performance of mathematical models.

In the document entitled "*State-of-the-art of Optimization Methods for Short-Term Scheduling of Batch Processes*" (MENDEZ, C. A.; CERDA, J.; GROSSMANN, I. E.; HARJUNKOSKI, I.; FAHL, M. Computers & Chemical Engineering v. 30, n. 6/7 (May), pp. 913-946. 2006) a work is presented in which the authors performed a state of the art evaluation in optimization methods for problems of programming of batch processes considering the issues of representation of time and events, material balance and function goal. An evaluation of the use of mathematical methods in real industry problems is also made and based on this, it is claimed that these techniques can be used together with heuristic methods and decomposition techniques, in order to keep the number of decision variables of the model within an acceptable level. This work mentions a line of studies involving hybrid models for solving scheduling problems.

In the document entitled "*Development of Refinery Scheduling System Using Mixed Integer Programming and Expert System*" (BOK, J.; HEEMAN, L.; CHANG, J. W.; PARK, S. North, v. 19, n. 4, p. 545-551, 2002) a work is presented in which the authors have proposed a hybrid system for solving the scheduling problem combining MILP and an "expert system", one of the artificial intelligence approaches based on building rules extracted from an operational database. For a given oil specification to be processed, set in the planning, the formulation of mathematical optimization has determined the amount of oil that should be moved between the groups: storage tank-loading tank and loading tank-distillation unit. The conditions of the movement between these groups were determined by the expert rules so that the number of transitions were minimized. In other words, quantitative decisions were taken by the MILP model, while the qualitative were taken by the expert system. In this study the programming of oil was represented as several module problems: ship unloading, transfer between storage and loading tanks and, finally, the loading of the processing units. Each module was treated with autonomy, with their specific goals and the more efficient algorithm for the problem. For example, in the module for the unloading of the ship, whose goal was unloading the oil as soon as possible, the expert system decided what would be the storage tank used on the basis of the inventory (volume and composition) of available tanking. Thus, the optimization is for each module and not necessarily the complete solution.

In the document entitled "*Hybrid methods using genetic algorithm approach for crude distillation unit scheduling*" (DAVE, d.; ZHANG, NO. p. 445-450, 2003) a work is presented in which the authors have developed a hybrid model using AG and MILP. The first decision level was directed by the AG and consisted in determining the sequence of activities to be performed. The second level consisted in determining all other decision variables through the solution of a deterministic model. The proposal behind this division was removing some decisions from the deterministic model represented by entire variables that burden significantly this kind of representation. The representation was validated for the scheduling including ship unloading, storage tanks and loading tanks, in addition to 2 distillation units. Issues of quality or composition were not mentioned. The results of this approach have been challenged with the solution for the same scenario obtained using an exclusively deterministic modeling with discrete time, where it has been demonstrated that the two models reached the same goal function, with the hybrid model having better computing performance.

A few years ago it is observed around the world the increase in the number of applications provided with artificial intelligence systems and for the oil industry this was no different, and it is possible to find some studies in this line.

In the document entitled "*Programação da Produção em Refinaria usando Algoritmos Genéticos: um Estudo para o Caso do Scheduling de Petróleos*" (DA CRUZ, D. D. S. Dissertação de Mestrado. Universidade Federal do Rio de Janeiro, Rio de Janeiro. 2007) a work is presented in which the author proposed a model based on genetic algorithms where the chromosome had three segments: the first, based on order, determined the sequence of tasks to be performed, the other provided the resources (equipment) of origin and destination to be used, depending on the task. The scope handled the scheduling of the unloading of the ships, terminal-refinery handling through pipeline and loading of two atmospheric distillation units. The multiple goal evaluation considered criteria to meet distillation processing, pipeline movement, no delay in unloading of ships, minimization of tank exchanges between activities, among others. The indirect representation of chromosome left to the decoding step the responsibility of submission of tasks for service testing of constraints. The representation of time was handled indirectly from the definition of a minimum lot for performing each activity. To increase the probability of performing all the tasks needed to the programming horizon, the size of the chromosome was defined from the task number obtained by dividing the total volume that could be transferred between all areas of scope by the said minimum lot. The size of the chromosome was one of the difficulties faced in evolution. Restrictions of load quality were treated as penalties for non-compliance with the objective of maintaining the unit load. Activities that were already ongoing at the beginning of the programming horizon were not included.

In the document entitled "*Genetic algorithms applied to scheduling and optimization of refinery operations*" (OLIVEIRA, f.; ALMEIDA, M. R.; HAMACHER, S. SAW ALIO/EURO. Workshop on Combinatorial Optimization Applied, Buenos Aires. 2008) a work is presented in which the authors proposed a model based on AG. The scope handled the scheduling problem of fuel oil and asphalt production. The direct and indirect representations of chromosome were evaluated. In direct representation, the time was discretized and each gene represented the activity performed in the interval of one hour. Consequently, for a given scenario, all chromosomes of the population had the same size. The chromosome was constructed based on the demand for each product and would maximize their production in each time interval. In indirect representation each gene was associated with the demand for a product. The goal was to find a sequence of activities that were viable for this production. The decoding dealt with the time needed to meet this demand, considering when it should be ready and the time required for production, regardless of the inventory in the tank. The impossibility of allocating the necessary resources for this production at the right time was one of the greatest challenges for these approaches. Four scenarios were used to evaluate the proposed models, however, not all met the production goals.

In the document entitled "*Refinery Crude Oil Scheduling by Integrating Graph Representation and Genetic Algorithm*" (RAMTEKE, M.; SRINIVASAN, R. Large-Scale. Industrial Engineering Chemistry Research &, p. 120, 328, 092, 932, 001, 26 Mar. 2012) a work is presented in which the authors developed an integration between the graph representation and genetic algorithms (structure adapted genetic algorithm—SAGA) to solve the problem of scheduling of a refinery contemplating unloading of ships directly in the refinery tanks and the loading of the process units, modeling also underwater line through which the oil transported by large-capacity ships is moved to the refinery. The chromosome was modeled in order to contemplate two parts, called structural sub-chromosome and weight sub-chromosome. The structural sub-chromosome represented the operationally viable structures defined by sub-graphs and covered constraints of the type: a tank cannot receive and send at the same time, or two portions cannot be unloaded simultaneously. The weight sub-chromosome represented the weights of each edge present in structural sub-chromosome. These weights had relationship with the flow of activity that each edge represented in a given period.

The interpretation of sub-chromosomes was made for each period where, in the structural sub-chromosome there was a sub-graph that represented the activities for that period and in the weight sub-chromosome the flows of these activities. Constraints for flow and capacity are treated in the mass balance of weight sub-chromosome. Restrictions or targets for quality or production were not handled. The programming horizon was treated in periods of time which assumed that the flows of all equipment do not change within each of these periods.

The modeling was evaluated in 24 scenarios with different degrees of difficulty and compared with a modeling using AG+MILP, showing less variation range for the run time and goal function similar in most cases.

Despite the works mentioned above, it is observed that presently the oil production programming is made without the use of optimization tools to aid the efficient decision-making process for the activities as a whole. Generally speaking, these decisions come from the programmer's experience-based knowledge, with the help of worksheets or specific tools for solving some of the related problems, since the models currently developed, some mentioned above, cannot solve in a satisfactory and global way the programming problems of oil in a refinery.

As it will be better detailed below, the present invention aims to solve the problems of the state of the art described above in a practical and efficient way.

SUMMARY OF THE INVENTION

The present invention has as its main purpose to provide a method and an optimization system based on genetic programming with quantic inspiration using a domain-specific language for the solution of programming problems of oil.

Thereby, in order to achieve this goal, the present invention provides a method of programming optimization of oil in a refinery through linear genetic grammar-oriented programming and with quantic inspiration, including the steps of:
- a) observing, in a module of genetic programming, each quantic individual in a population comprising a plurality of quantic individuals, where each quantic individual has a probability distribution to represent oil programming solutions, and through an interpretation of the grammar created from a domain-specific language, generate classical individuals from each quantic individual observed, each classical individual consisting of a list of instructions for oil programming activities;
- b) run, in a simulation module, each one of the instructions for oil programming activities in at least one iteration;
- c) verify, in a module of constraint, if each of the instructions for oil programming activities meets the predetermined limits of refinery operation;
- d) create, in a solution building module, a plurality of oil programming objects, each one created from each classical individual, including instructions for oil programming activities selected from the result of steps b) and c);
- e) evaluatie and sorti, in a module of goals, each one of the plurality of oil programming objects according to predetermined criteria of refinery operation goals;
- f) in which:
- f1) in case a predetermined stop criterion is reached, selecting the oil programming object evaluated and ranked as the best solution among the plurality of oil programming objects; and
- f2) in case a predetermined stop criterion is not reached:
- g) selecting a predetermined amount of programming objects of oil assessed and classified as being the best solutions among the plurality of oil programming objects;
- h) starting a new iteration from step a); and
- i) changing the probability distribution for each quantic individuals to be observed in step a) according to the classification of programming objects of oil assessed and classified as the best solutions among the plurality of programming objects of oil through a quantic operator.

The present invention further provides an optimization system for programming of oil in a refinery through grammar-oriented linear genetic programming and with quantic inspiration, the system comprising:
- a genetic programming module adapted to observe each quantic individual of a population comprising a plurality of quantic individuals, where each quantic individual has a probability distribution to represent oil programming solutions, and through an interpretation of the grammar created from the domain-specific language, generating classical individuals from each quantic individual observed, each classical individual consisting of a list of instructions for oil programming activities;
- a simulation module adapted to perform each one of the instructions for programming activities of oil in at least one iteration;
- a module of constraints adapted to verify that each one of the instructions for programming activities of oil meets the predetermined limits of refinery operation;
- a solution building module tailored to create a plurality of oil programming objects, each one created from each classical individual, each oil programming object including instructions for oil programming activities selected from the result provided by the simulation and restrictions of modules;
- a module of goals adapted to evaluate and classify each one of the plurality of oil programming objects according to predetermined criteria of refinery operation goal;

where:
- in case a predetermined stop criterion is reached, the goals module is additionally adapted to select the oil programming object evaluated and ranked as being the best solution among the plurality of oil programming objects; and
- in case a predetermined stop criterion is not met, the goals module is additionally adapted to:
- selecting a predetermined amount of oil programming objects assessed and classified as being the best solutions among the plurality of oil programming objects; and
- changing the probability distribution of each one of the quantic individuals to be observed by the genetic programming module in a new iteration according to the classification of oil programming objects assessed and classified as being the best solutions among the plurality of oil programming objects through a quantic operator.

Finally, the present invention provides means of readable storage, including instructions that, when executed by a processor, perform the method as defined above.

BRIEF DESCRIPTION OF THE FIGURES

The detailed description displayed below makes reference to the attached figures and their respective reference numbers, representing the categories of the present invention.

FIG. 1 illustrates a flowchart of the oil programming optimization method in refineries according with a preferred embodiment of the present invention.

FIG. 2 illustrates an example of structure BNF (Backus-Naur Form) to define the syntax of a specific language.

FIG. 3 illustrates an example of production that can be generated, in which the function was developed from the BNF presented in FIG. 2 in C language.

FIG. 4 illustrates a BNF structure that represents a grammar of the specific language for the problem solved by this invention.

FIG. 5 illustrates the representation of a qudit (each of the quantic genes that make up each individual of the quantic population) with probabilities not evenly distributed.

FIG. 6 illustrates a function that sets the value of a token associated with the observation of qudit in FIG. 5.

FIG. 7 illustrates an example of probability distribution of the symbol <func> in a quantic gene.

FIG. 9 illustrates all the possibilities of the qudit states of a quantic gene.

DETAILED DESCRIPTION OF THE INVENTION

Figure 8:
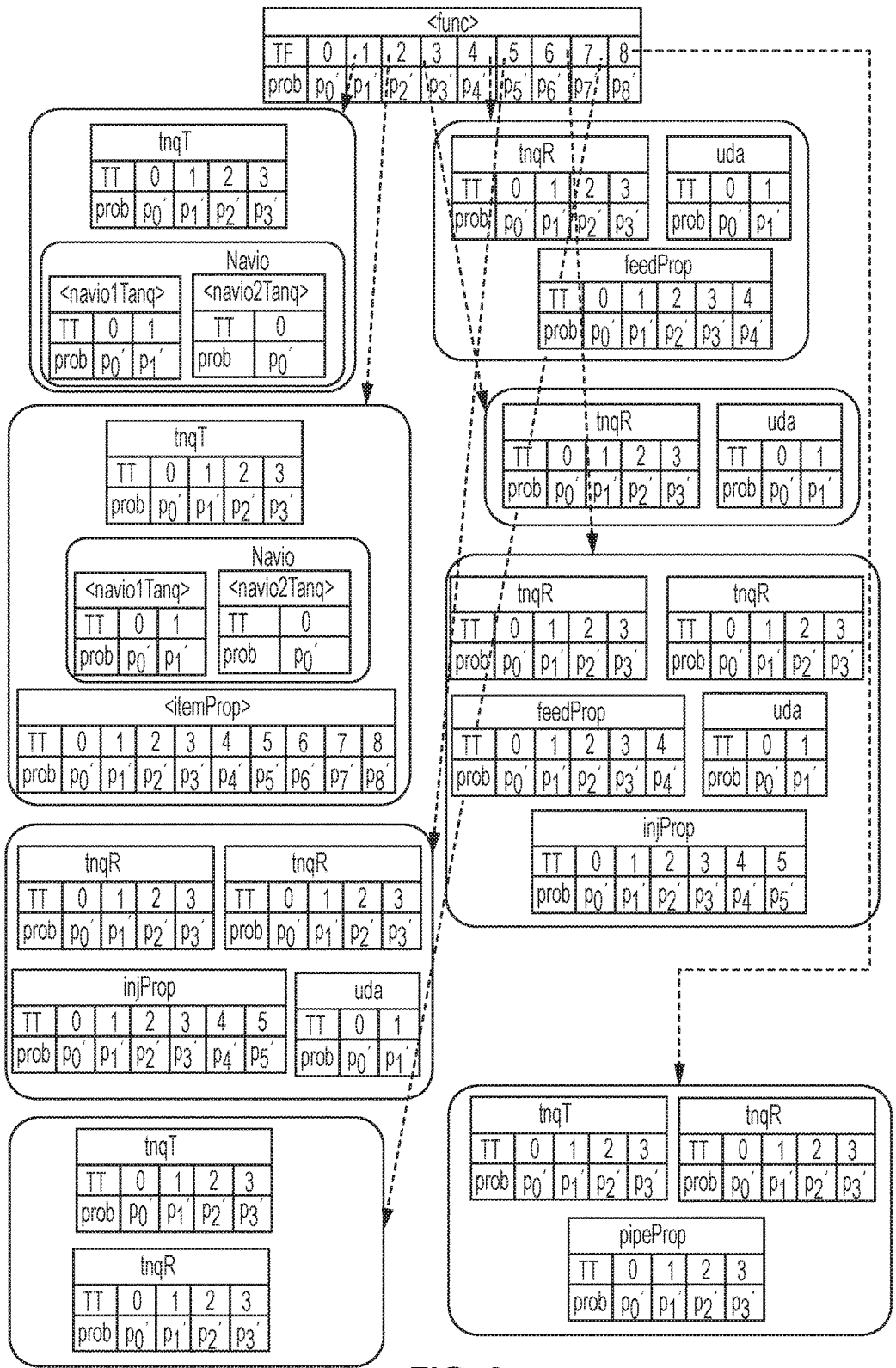
FIG. 8 illustrates a tree structure which represents the quantic gene implemented in the present invention.

Preliminarily, it should be noted that the description below will depart from a preferred embodiment of the invention, applied to oil programming of a refinery. As will be clear to any skilled in the art, however, the invention is not limited to this particular embodiment, since the novelty method presented here can be applied to the solution of other complex problems related to optimization of processes involving decision making in refineries.

FIG. 1 illustrates a flowchart of the method and optimization system for oil programming in refineries according to one preferred embodiment of the present invention. Such method and system use Linear Genetic Programming oriented to Grammar and with Quantic Inspiration (PGLOGIQ), being that this type of genetic programming (PG) is described with more details and exemplified throughout this description.

Basically, the method and the system according to the embodiment of this present invention can be described by the interaction, on two levels, of a plurality of modules that make up the invention. In the first level, as illustrated at the top of the flowchart of FIG. 1, a genetic programming module provides necessary information for running the solution building module, which in its turn provides the information necessary for the performance of a goals module which, in its turn, provides the necessary information for running the genetic programming module or terminates the process and presents the solution of oil programming generated. The second level, illustrated at the bottom of the flowchart of FIG. 1, is given by the detail of the running of a builder module of the solution, which interacts with the simulation module to generate the information demanded in the first level. In turn, the simulation module interacts with the restrictions module to generate the necessary information to the constructor module. The role of each module is explained as well as the steps of the method of generation of the optimized solution, as follows.

The module for genetic programming (PG) optimizes the tasks and resources required to accomplish the goals. It represents the essential element of this invention, comprising an algorithm developed to treat the problem of production programming in oil refineries, in a synergetic way, from knowledge in genetic programming, quantic inspiration and domain-specific language (PGLOGIQ model mentioned above). This model was built on the entities: quantic individual, classical individual, quantic operator, domain-specific language and its respective specification for grammar. The quantic individual represents the superposition of all possible programming solutions in the defined search space (through a probability distribution that can result in either of these solutions). Its observation generates a classical individual (linear representation of an instructions sequence also defined based on grammar), from which the builder module generates a solution. The quantic operator promotes evolution by acting on quantic individuals from the information generated by running the goals module. The domain-specific language and its grammar guarantee the adequate application of the model to the oil programming problem in a refinery. Details and application examples for a better understanding of the working of genetic programming module that uses the PGLOGIQ model are shown below.

As mentioned, the method and the system of the present invention make use of a novelty modeling for the solution of programming problems in a refinery: the Linear Genetic Programming oriented to Grammar and with Quantic Inspiration (PGLOGIQ). This type of modeling, as its own name already anticipates, is based on two types of genetic programming already known: (i) Genetic Programming Oriented to Grammar and (ii) Linear Genetic Programming with Quantic Inspiration.

The Genetic Programming Oriented to Grammar allows you to automatically generate programs in arbitrary languages, which is extremely desirable due the convenience of choosing a specific programming language to a certain application domain. Most of the systems developed with this kind of programming use the BNF notation (Backus-Naur Form) for free of context grammars, in order to specify the syntax of the developed language. A BNF describes permissible grammatical structures in the construction of a language through the quadruple: {S, N, T, P}, where S denotes the start symbol, N denotes the set of non-terminal symbols, T denotes the set of terminal symbols and P are the productions. From the analysis of FIG. 2 it is possible to understand the used syntax. S is the start symbol. If it is set between the characters "<" and ">", they are not terminal symbols and, if it is set between quotation marks they are terminal symbols. The signal "::=" denotes the assignment. The vertical bars separate the construction alternatives of the symbol. For example, for the FIG. 2, <op> can assume the values "+" or "−" or "/" or "*". For example, the interpretation of <code> is to replace it by <code> or <line> <code>. A L-language(G) generated by a G grammar defined by a BNF, is the set of all the sentences that can be derived from S. To create a sentence in a particular language it is necessary to choose which productions will be used and in what sequence they will be used, the function meant for the evolutionary algorithm. FIG. 3 presents an example of a production that could be generated, in which the "myfunction (float x)" function was developed from the BNF presented in FIG. 2, in C language.

The document entitled "*Sintese de Sistemas Digitals Utilizando Técnicas Evolutivas*" (ARAUJO, S. G. Tese de Doutorado. Universidade Federal do Rio de Janeiro, COPPE/UFRJ, Rio de Janeiro. 2004) provides more details regarding the genetic grammar-oriented programming, and its description is incorporated here as a reference.

The Linear Genetic Programming with Quantic Inspiration, in turn, proposes classical algorithms that take advantage of the paradigms of quantic physics, such as the superposition of states, to improve their performance in solving problems.

In a classical computer, bit is the smallest unit of information, and may take the values of 0 or 1. In a quantic computer, the basic unit of information, called a q-bit, can assume the states of $|0>$, $|1>$ or a superposition of the two states. This superposition of two states is a linear combination of states $|0>e|1>$ and can be represented by:

$$|\Psi>=\alpha|0>+\beta|1>$$

where Ψ represents the state of the q-bit, α and β are complex numbers that represent the probability of 0 and 1 states when the q-bit is observed (or measured).

The document entitled "*Programação Genética Linear com Inspiração Quântica*" (DIAS, D. M. Tese de Doutorado. Pontificia Universidade Católica do Rio de Janeiro, Rio de Janeiro. 2010), whose content is incorporated here as a reference, describes the use of Linear Genetic Programming with Quantic Inspiration for Solution of Complex Problems.

However, the method of the present invention is used to evolve programs that propose a solution to the oil programming in a refinery through the use of arbitrary imperative language, specific to the area treated. Thus, it was defined a grammar and its syntax so the instructions are generated. Classical individuals have a linear representation where each classical gene represents an instruction, while quantic individuals are composed of genes with a tree-like structure and built according to the orientations of the defined grammar. Given these characteristics, it can be observed that the present invention proposes a modeling where references to linear genetic programming, to genetic programming oriented to grammar and to evolution with quantic inspiration coexist and for this reason the proposed modeling is named as Linear Genetic Programming oriented to Grammar and with Quantic Inspiration (PGLOGIQ). Opposite to crossover and mutation operators conventionally used, in the present invention the evolution is handled by the quantic operator who works with the probabilities of selection of instructions and its arguments in each gene of the individual. In the present description, the basic unit of information, which is a generalization of the quantic bit, is treated as qudit.

The PGLOGIQ is based on quantic and classical individuals that represent, respectively, the genotype and the phenotype of an evolutionary structure, beyond the quantic operator and functions and terminals sets. These elements will be more detailed below.

The method of the present invention is implemented by making use of a domain-specific language (Domain-Specific Language DSL) that represents many activities associated with the unloading of ships, terminal-refinery movements and loading of distillation units. To represent them, a specific mandatory language was implemented to the proposed problem domain. Table 1 presents the structure of the data types used in this invention. The list of functions and arguments that compose it is presented in Table 2.

TABLE 1

Structure of the data types used in the system

| Structure | Data |
|---|---|
| Input data (stationary) | List of oils and their properties (density, sulphur, acidity). Yield of cuts for distillation of each oil and properties thereof (density, sulphur, acidity) in the units. Restrictions (can be configured at any time, but the same restrictions were used in 5 scenarios assessed in this work). Plant: Tank in the terminal and refinery: ballast and total capacity. Pipeline: volumetric capacity Source-destination representation between equipment. |
| Input data (for each scenario) | For each ship: Date/time of arrival and unloading tolerance. Unloading flow. For each CN tank: volume and composition of the oil mixture. Inventory of the terminal and refinery tanks, pipeline and underwater line (volume and composition of the oils mixture) at the start of the scenario. The pumping flow from the terminal to the refinery. Operation mode of distilling units: programmed flow and campaign flow. |
| Decisions of the model | Sequence of activities to be performed. Unloading of ship: Origin tank of the ship (CN tank). Target tank at the terminal. Volume of activity (volume in the ship, space available at the refinery or fraction). Terminal-Refinery Movement: Source tank at the terminal. Target tank at the refinery. Volume of activity (source tank volume, space in the destination tank, portion inside the pipeline or fraction). Distillation load unit: To use only a loading tank to give feed load to a process unit or to use loading base tank and injection tank. Loading base tank and if applicable, injection tank. Percentage of volumetric participation of the injection tank, if applicable. Volume of activity. |

TABLE 2

Functions and arguments developed for the language

| Function | Arguments | Description |
|---|---|---|
| NOp | | Does not run any activity. It is used to indirectly control the size of the individual. |
| RcvItemMax | CN Tank Underwater line Tank of the Terminal | It transfers from the ship to the terminal the maximum volume possible for the activity which is equivalent to the smallest value between the available space in the tank of the terminal and the CN tank. |
| RcvItemProp | CN Tank Underwater line Tank of the Terminal Proportion of the Item | Similar to the RcvItemMax function. The difference is that the transferred volume is a proportion of the maximum. |

TABLE 2-continued

Functions and arguments developed for the language

| Function | Arguments | Description |
| --- | --- | --- |
| FeedCduMax | Distilling unit<br>Loading Tank | It transfers oil from only a tank of the refinery to feed a distillation unit. The maximum volume possible for the activity, which is equivalent to all the useful volume available in the tank. |
| FeedCduProp | Distillation unit<br>Loading tank<br>Loading ratio | Similar to the FeedCduMax function. The difference is that the transferred volume is a proportion of the maximum. |
| FeedCduMaxInj | Distillation unit<br>Loading tank<br>Injection tank<br>Proportion of injection | It transfers oil from two tanks (base and injection) of the refinery to feed a distillation unit. The maximum volume possible for the activity, which is defined by the ratio between the useful volume available in each of the tanks and the injection percentage defined by the task. |
| FeedCduPropInj | Distillation unit<br>Loading tank<br>Injection tank<br>Proportion of injection<br>Loading ratio | Similar to the FeedCduMaxInj function. The difference is that the transferred volume is a proportion of the maximum. |
| PipeTransfMax | Terminal Tank<br>Refinery Tank | It transfers from the terminal to the refinery the maximum volume possible for the activity, which is defined by the ratio between the useful volume available in the terminal tank, the available space in the refinery tank and the volume of the portion that will be moved |
| PipeTransfProp | Terminal Tank<br>Refinery tank<br>Pipeline volume ratio | Similar to the PipeTransfMax function. The difference is that the volume transferred is a proportion of the maximum volume. |

It was necessary to formalize this language through a syntax that would guarantee the creation of valid instructions by the system. The chosen notation to define its grammar is based on the BNF. FIG. 4 presents the BNF for an example of application of the method for the present invention, which was the scenario used for the definition of the parameters of the evolutionary model described here. The interpretation based on the quadruple presented in FIG. 2 demonstrates that the <func> symbol represents the PG functions and can take the values NOp, RcvItemMax, etc. NOp is the only terminal element of the symbol <func>, all other functions have symbols that refer to other assignments. The symbol <navioeTnq> represents the ship that is connected to the underwater line and, depending on the symbol <navio1Tnq> or <navio2Tnq>, which is the CN tank (logical representation of compartments of the ship indicating how many different oil mixtures should be unloaded) being unloaded from this ship. The other symbols, such as <tnqT>, <uda> and <itemProp>, define the terminal elements. A production example (P) of this structure is the FeedCDU-Max (TqR04, UDA-02) instruction, whose interpretation is that the TqR04 is the only tank in the load of the unit UDA-02 and that this activity is performed with maximum volume.

In this representation, the only variable symbol between the scenarios of the system was <navioeTnq>. This symbol concentrates information about the number of ships to be unloaded in the scenario and the amount of CN tank carried on each ship. In FIG. 4, "navio1" and "navio2" of the element <navioeTnq> means that there are two ships to be unloaded, the symbols <navio1Tnq> (values "tanq1" and "tanq2") and <navio2Tnq> ("tanq1" value), indicate that the first ship has two CN tanks and for this reason it carries two different mixtures of oil and the second ship carries only one CN tank and, consequently, one mixture of oil.

Regarding the representation of individuals, when proposing to solve problems of scheduling, four basic representations are made, which are: selection of a number of activities to be performed within a time horizon in order to meet certain requirements; allocation of resources for performing these activities in accordance with restrictions of their availability; definition of a sequence for the selected activities respecting the precedence constraints; and determination of the moment in time to use the resources for the activities.

Each classical individual represents a complete solution of scheduling and each classical gene represents a programming activity with resources allocated and defined volume. Therefore the number of activities to be performed and its sequencing would be defined.

The PGLOGIQ is based on the following entities:

(i) chromosome of the "quantic individual", which represents the superposition of all possible programs for the predefined search space;

(ii) chromosome of the "classical individual", generated from the observation of quantic individual and through which the program that builds the scheduling is created.

(iii) token of the function (TF): unique identifier that internally represents the PGLOGIQ functions described in tables 1 and 2.

(iv) terminal token (TT): unique identifier that internally represents the PGLOGIQ terminals described in tables 1 and 2.

As already mentioned, the basic unit of information adopted here is qudit. This information can be described by a state vector in a quantic mechanical system of d levels, which is equivalent to a dimensional vector space (d), where d is the number of states in which the qudit can be measured. In other words, d represents the cardinality of the token that will have its value determined by observation of its respective qudit.

The state of a qudit ($\Psi$) is a linear superposition of d and states and can be represented by the sum of the probabilities that the qudit is found in each state when observed. A qudit represents all probabilities until the moment when it is observed, indicating the value of the associated token (function or terminal) to this observation.

The state of a qudit is implemented as a data structure similar to a roulette. FIG. 5 illustrates the implementation of a qudit with non-uniform distribution of the probabilities of each state for the main functions implemented in PGLOGIQ.

The implementation of the observation process of qudit can be defined by the function presented in FIG. 6. In this figure, r is an actual value between 0 and 1 randomly generated as the first step of observation, and T(r) returns the value observed for the token, indicating the function or terminal that was observed.

The interpretation of FIG. 7 says that, for the main function (symbol <func>) of the gene in question, there is probability of 0.336 of the statement "NOp" being observed, 0.011 for the instruction "RcvItemMax" to be observed, 0.590 for the instruction "RcvItemProp" being observed (see RcvItPr in FIG. 7) and so on. The same structure is used for the representation of the terminals associated with the arguments of each main function.

The chromosome of the quantic individual, or "quantic chromosome", is represented by a list of structures called "quantic genes". A quantic gene is composed by a qudit of a (QF) function, which represents the superposition of all the predefined functions for the set of functions and each of these functions makes reference to qudits of terminal (QT), in a continuous process until all functions and terminals defined by the grammar are represented. The structure developed for the quantic gene resembles the tree representation of the traditional genetic programming. However, in the present invention, it is applied to the quantic gene and not the generated program. FIG. 8 shows the tree structure that represents the quantic gene implemented in this model and FIG. 9 details the possibilities of each state.

A classical gene, in turn, is the result of all the observations of a quantic gene needed to define the main function and its arguments, which means that each classical gene represents a complete instruction for the program. The chromosome from one individual is composed by the linear arrangement of all classical genes. The execution of the program generated by the classical individual is made from the first to the last line, as it is characteristic of linear genetic programming, where each of these lines is a classical gene. After undergoing the restrictions tests, the classical individual represents the scheduling of the scenario.

As each quantic gene is observed to generate a gene of the classical individual (i.e. a full instruction), these individuals necessarily have the same length. However, despite the chromosome of the classical individual having a fixed length, the effective program that it represents has variable length due to the existence of the "NOp" instructions on a set of main functions. This is because these instructions represent a "no operation", which makes the process of program generation to ignore the genes in which the NOp to be the equivalent instruction to the observed token, i.e. the value of the token function equal to 0.

For a better understanding of how the observation of the quantic gene occurs and the consequent definition of the value of the associated token, the example shown in the FIG. 7 below will be used, which represents the state of a quantic individual after a few evolutionary iterations. Consider that for the main function the value of 0.796 was randomly generated and, therefore, by applying the equation represented in FIG. 6, the function token observed will assume the value of 2, representing the RcvItemProp function. This function demands the arguments navioeTnq, tnqT and itemProp. Respecting the sequence of arrival of the ships, the first to be unloaded is the navio1 and according to FIG. 8, it is known that this ship has two CN tanks that should be unloaded. With the observation of this gene, a value of 0.33 is randomly generated and therefore, by applying the equation represented in FIG. 6, the terminal token observed will have a 0 value, representing the first CN tank. The equivalent process is done for the arguments tnqT and itemProp, for which is supposed that 0.645 and 0.6 values were generated randomly, respectively. By applying the equation of FIG. 6, the terminal token observed for the terminal tank will have the value of 3 and for the proportion of the item the value will be 1, corresponding to the terminal elements: TqT04 and itemProp 0.4. The completion of the observation process of this quantic gene implies the generation of the classical gene which is given by the RcvItemProp (navio1-tan queCN1, TqT04, 0.4) instruction, i.e., unload from ship 1 CN tank to TqT04 in the volume equivalent to 40% of the maximum possible for this activity.

In the light of the details of the operation of the genetic programming module above, the logical sequence of steps illustrated in the flow chart of FIG. 1 is resumed.

The method of the present invention begins preferably with the definition of premises of optimization, i.e. inventory, limits and prioritization of goals. For the inventory, the example to be mentioned, is what is the volume and oil composition in each tank at the start of the scenario. As limits, the quality constraints can be mentioned, such as sulfur and acidity, that oil flows or cuts of atmospheric distillation can have. For goals, one can mention as an example, that the uninterrupted operation of the units of atmospheric distillation is prioritized over the unloading, without delay, of oil ships which, in turn, is prioritized on the uninterrupted operation of pipeline, etc.

After the definition of the assumptions, the genetic programming module generates the first quantic population. This population consists of quantic individuals (for example, 6 individuals), where each individual has a probability distribution to represent the oil programming solutions.

The genetic programming module receives ranked classical individuals (oil programming objects) resulting from a solution previously evaluated in the goals module (this step is further detailed below). According to the order of classical individuals and using the quantic operator, it changes the probability distribution of each quantic individual in order to increase the probability that the observations carried out retrospectively result in better individuals at each iteration. This step is repeated many times until the required level to achieve the stop criterion defined in the premises, as for example: it must be performed 40 thousand iterations.

Subsequently, the genetic programming module observes (a term that represents the draw among existing options) every quantic individual and, through the interpretation of the grammar created from a domain specific language developed, generates each classical individual. This classical individual is a list of oil programming instructions that may or may not be performed. The genetic programming module sends each classical individual to the simulation module. Optionally, only in the first iteration, each quantic individual goes through an observation step twice to create twice the classical individuals to sort and discard half of them, as will be described later.

The assessment of an individual in PG contemplates full execution of the program that he represents. In this invention, to achieve such operation, the classical individual has each one of its instructions iteratively evaluated. This step is performed by the solution building module, which takes each classical individual and runs all existing activities in the classical individual trying to run them. In order to do this, it sends each activity to the simulation module. The simulation module calculates all information necessary to represent the activity as, for example, duration, volume of oil in tank, composition and quality that the chains will have after completion of the activity. For each classical gene, that is, for each activity that it is intended to run, the simulation module preferably performs the steps of:

assessing the compliance with all the relevant restrictions;
establishing, based on the volume of activity and the information from the simulation module itself on the source and destination equipment involved, the initial moment, the duration and, consequently, the end time of each activity;
calculating the inventory of equipment of the plant after the execution of the activity.

Not all the instructions generated by the observation of the quantic individual and that comprise the classical individual can be performed. Some suggested programming instructions may not be performed because they violate restrictions defined in the premises. For example, a classical gene can contain the FeedCDUMax instruction (UDA-01, TqT03) and when trying to run it, the simulation module identifies that it violates a minimum time activity constraint, because TqT03 does not have enough volume to stay in the load of UDA-01 for at least 24 hours. Thereby, one of its instructions is preferably subjected to different premises and restrictions for the modeling implemented, this step which is performed in the constraints module. The constraints module receives each activity from the simulation module and checks whether its execution would violate any of the established premises. Then, it returns to the simulation module if the activity can be performed or not.

In the proposed method and system, the classical individual is traversed linearly from the first until the last gene and the activities performed are transferred to a structure that represents the schedule effectively, representing the programming solution for oil production. The linear execution is done iteratively, i.e. after the attempted execution of the last instruction, the individual is again covered completely. This cyclic process is interrupted when a full scan of the individual does not imply on executing any instruction. For example, if each classical individual consists of 128 genes, meaning this means there are up to 128 activities represented in this individual. The first iteration between the steps of simulation (simulation module) and of constraints evaluation (constraints module) starts with the attempted execution of each one of up to 128 activities. The second iteration will range through the same activities trying to run them again, however, represented in another instant in time in the programming horizon. It goes on until in iteration n, after having covered the 128 genes, no activity is performed, either in the end of the programming horizon, or for not having resources available for the achievements.

After the building of the schedule, in the solution building module, it is then submitted to the evaluation step of the solution found, performed in the goals module. Preferably, the goal module gathers the schedule objects generated from the classical individuals generated in this iteration with the results from the previous generation. In the first iteration, the classical population may have twice the individuals and the evaluation is done only among these. Additionally, the goals module sorts and classifies all classical individuals according to the evaluation of the corresponding schedule object obtained from the sorting criteria defined as a premise for the goals.

The goals module, then, identifies whether the current iteration is the last one to be executed, i.e. if the stop criterion was reached. If this is the case, it presents the individual ranked in first place as the optimized oil programming solution. If it is not reached, it preserves the individual in the first rank (makes a copy) and sends to the PG module the first places after classification (same number of individuals that was generated in the quantic population). The other classical individuals are discarded.

In the present invention the evolution pursued and carried out in the goals module is oriented to the fulfillment of goals prioritized preferably according to the following description:

1. Compliance with the loading operation of the UDA: the distillation units must operate continuously throughout the scenario. Solutions that minimize the total stoppage time for the UDAs are classified as best. For the calculation of this time, each one of the UDAs is considered, for example, if a UDA stops for 10 hours and another stops for 15 hours, the value of this goal will be 25 hours.
2. Unloading of the ship: the ship must be completely unloaded within the specified period. First it is evaluated if the ship has been completely unloaded. If there is no residual volume, it is assessed if there was no delay to complete this activity. This is the second most important goal to be fulfilled and measures the deviation from the perfect service, whose value is zero.
3. Pipeline operation time: it is an indirect measure to increase the movement between the terminal and the refinery, to meet the needs of the UDA loading and the maintenance of a safe inventory level at the refinery. Whenever the pipeline is stopped the increased formation of interface between the portions is facilitated. The interface is the mix between the oils of different portions that takes intermediate characteristics between them, which are unknown because it is not known how much of the original volumes became involved in the mix. For this and other operational reasons, solutions that minimize the time that the pipeline is inactive are the best.
4. Tank exchanges: each tank exchange operation causes a transient regime in the system, in addition to the cost (not quantified in this study) associated with the operation. If there is no benefit in carrying out an exchange of tank (for example, to satisfy constraints), the evolution must choose to minimize it.
5. Injection tank: the use of injection tank in the loading unit implies the allocation of two resources during the activity period, decreasing the availability of tanks in the refinery, which can turn programming difficult. As the last tiebreaker criterion between two individuals equally evaluated up to the moment, it will be considered as better the one that minimizes the use of this feature.

It is worth noting that it is allowed to configure the goal module so as to reorder the priorities/goals according to the criteria of each refinery.

The evolution of individuals in each cycle is based on the performance of quantic operator (OPQ) about the probabilities of observing the qudit. It is guided by the ability of these individuals through measurement of the evaluation function.

For the best classical individuals evaluated in the goals module and returned to the genetic programming module for a new iteration, the quantic operator increments, in the corresponding quantic individual, the value of a step (parameter of the template) for the probability of compliance with the functions and terminals of these individuals in each quantic gene. To ensure the consistency of the sum of probabilities, standardization of values is performed after the operator application. The OPQ action is shown in the equation below.

$$p_{(i,g)} = p_{(i,g-1)} + OPQ$$

where $p_{(i, g-1)}$ represents the probability of selection of the function or i terminal in generation, representing the function or terminal observed in the best individual in g−1 and OPQ represents the increase in the probability of observing the function or terminal.

Preferentially, regardless of the instructions that were not performed, all the classical genes from the best individuals are used to guide the evolution of their respective quantic genes.

Figure 10:
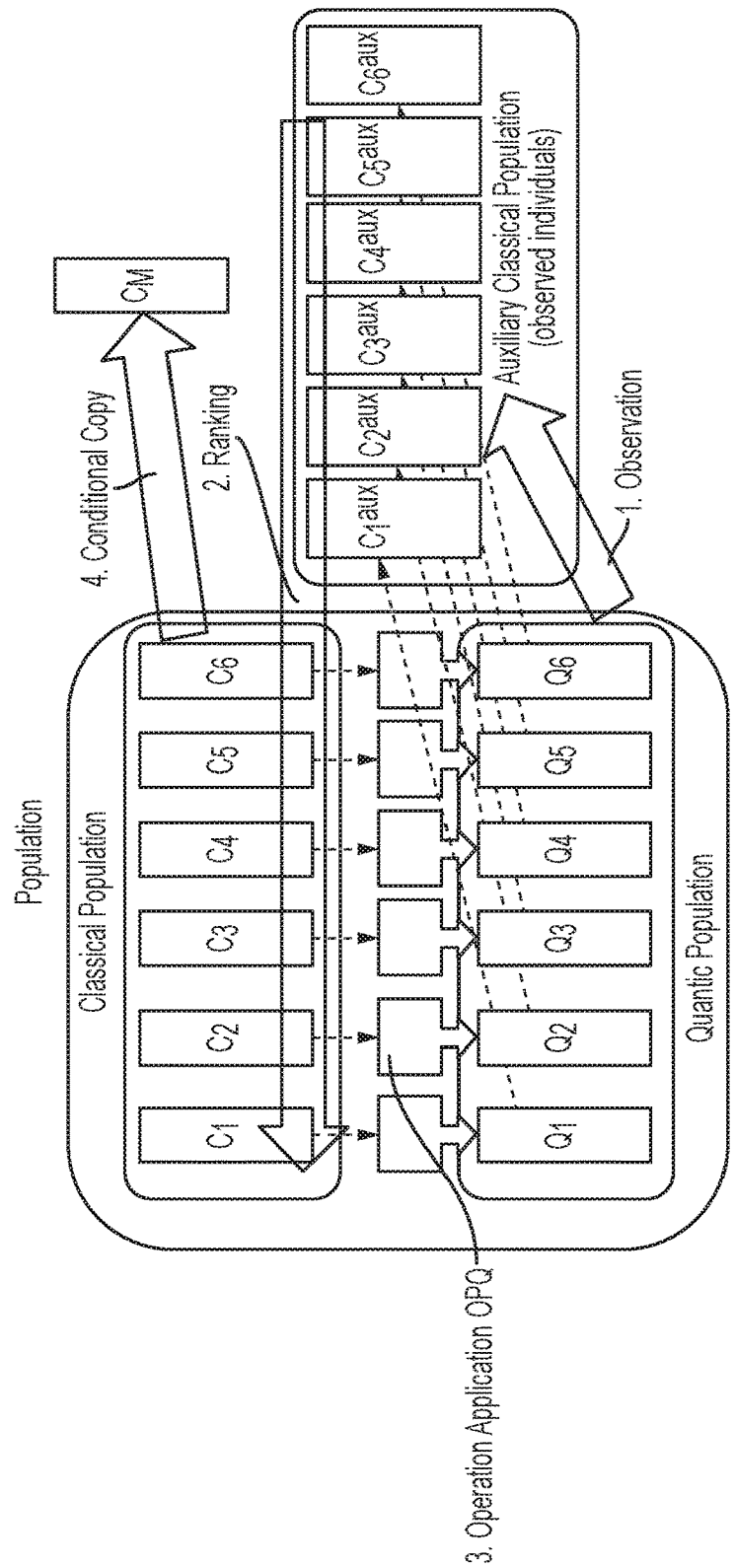
FIG. 10 illustrates a cycle of a generation of individuals according to a preferred embodiment of the present invention.

As already described, the genetic programming module handles two populations, one quantic and another classical both having the same number of individuals who, in turn, have the same size. The genetic programming module also handles an auxiliary classical population with the same dimensions of the previous population, that results from observations of quantic individuals of current generation and is used to define the best classical individuals obtained by joint ranking of this generation with those coming from the previous generation. FIG. 10 and described steps below characterize the cycle of one generation of PGLOGIQ.

1. The quantic population is observed, resulting in the auxiliary classical individuals.
2. The auxiliary classical individuals and the classical individuals from the previous generation are ranked according to the criteria of multiple-goal evaluation function. The classical population now comprises the best individuals (same number of individuals that make up the classical population of the previous generation, for example, 6 individuals).
3. Application of the quantic operator, i.e., the increment step in the probability of observation of each function and terminal that represents the classical individual, to the corresponding quantic individual. In the present description, it means that, for example, the 6 best classical individuals, guide in a sorted order the increments of probabilities for the 6 quantic individuals. It is in this step that evolution effectively occurs because it is when the quantic individual is updated in such a way as to increase the probability that evolution generate classical individuals more like the best raised until then.
4. Evaluation and comparison of the best classical individual obtained in this generation with the best classical individual from evolution until the present moment, is represented in FIG. 10 as $C_M$. If a new individual is better than $C_M$, this individual will be copied, replacing the present $C_M$.

Preferably, it is adopted that, for the set of functions present in the genetic programming module, the value of the probabilities of the NOp instruction would be a parameter of a template and the remaining instructions would have also distributed their probabilities, that is, if the total number of functions is nine and the initial value of the probability of observation of the NOp function is, for example, 0.8, the other main functions will have initial probability value given by 0.2/8, equal to 0.025, where 0.2 is the difference between the total (1.0) and the probability of NOp (0.8) and 8 is the number of instructions, excluding NOp. In the case of the arguments of these functions, all would initially receive a value evenly distributed of their probabilities, i.e., if the instruction FeedCDUMax has the argument "tnqR" the terminals "TqR01", "TqR02", "TqR03" and "TqR04", then each of these terminals will have its probability of observation started at 0.25.

The evolution of the individuals in the method and system of the present invention occurs through observation of the quantic individuals, evaluation and comparison of the classical individuals and application of quantic operator.

Figure 11:
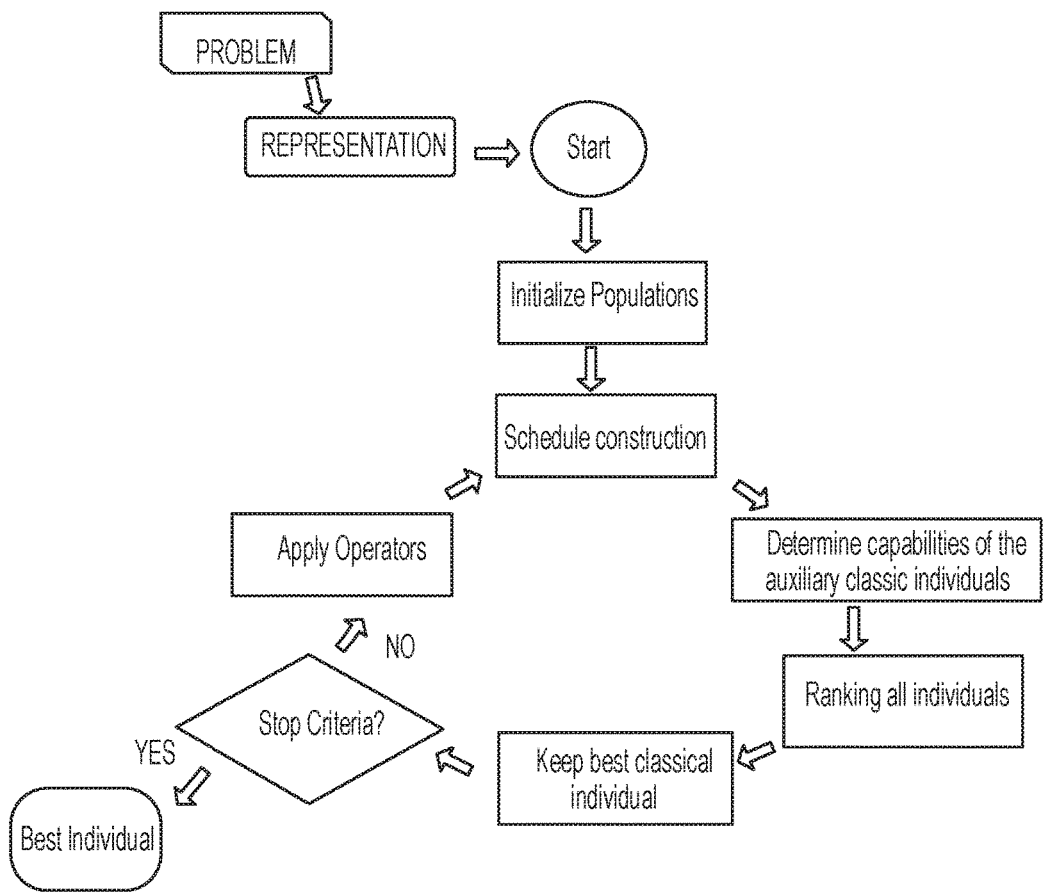
FIG. 11 illustrates a simplified cycle according to the preferred embodiment of the present invention.

To increase the capacity of the search model in the solution space and to avoid premature convergence, one can set that whenever the classical population converges so that the evaluation of all its classical individuals is equal, the quantic population and classical population is initiated again persisting only the best classical individual in the population. This mechanism to restart the population is called, in this present description, as reset. The stop criterion adopted can be the achievement of the number of generations defined for execution. FIG. 11 presents the simplified cycle of the model operation.

It is worth mentioning that the probability value of observation is an attribute associated with the quantic gene of each individual regardless of the argument list sharing the same terminal elements. For better understanding, consider an example in which, after a few generations, the quantic genes 27 and 102 have the probability distribution according to Table 3 below.

TABLE 3

Example of probability distribution for two quantic genes

| Instruction | Probability Distribution for Gene 27 | Probability Distribution for Gene 102 |
| --- | --- | --- |
| NOp | 0.400 | 0.360 |
| RcvItemMax | 0.100 | 0.030 |
| RcvItem Prop | 0.080 | 0.160 |
| FeedCDUMax | 0.286 | 0.310 |
| FeedCDUProp | 0.033 | 0.039 |
| FeedCDUMaxInj | 0.028 | 0.028 |
| FeedCDUPropInj | 0.017 | 0.015 |
| PipeTransfMax | 0.031 | 0.023 |
| PipeTransfProp | 0.025 | 0.035 |

Suppose that, when observing at each of these quantic genes, it has been pointed the same instruction FeedCDUMax. This function has the arguments "tnqR" and "uda" represented by the terminals presented previously. However, the probability distribution of these terminals may be different between the quantic genes 27 and 102, as presented in Table 4 below.

TABLE 4

Example of probability distribution for the same terminal elements in different quantic genes

| Argument | Terminals | Probabilities for Gene 27 | Probabilities for Gene 102 |
|---|---|---|---|
| tnqR | TqR01 | 0.439 | 0.088 |
|  | TqR02 | 0.018 | 0.135 |
|  | TqR03 | 0.291 | 0.103 |
|  | TqR04 | 0.252 | 0.674 |
| uda | UDA-01 | 0.679 | 0.771 |
|  | UDA-02 | 0.321 | 0.229 |

In the present invention, the activities are performed in an orderly manner from the linear reading of the genes of a classical individual. However, the definition of the instant in time when the activity occurs is known in the simulation module, that has the information about the availability of all equipments. The activity in question will be performed in the first instant in time in which the equipment are available. For example, a classical gene indicates that the TqR01 must feed UDA-01 with all its operating volume. The plant simulator will allocate this activity the first time in which TqR01 and UDA-01 are available. That is, if after performing the activities represented in previous genes TqR01 is available, for example, at the Instant 23 and UDA-01, for example, at the instant 33, this activity will be allocated on instant 33. After considering the useful volume of the tank and flow of the unit, the equipment will be available, for example, from the instant 67 for other activities represented for the next classical genes.

Next examples of results obtained through the application of the method and system according to the present invention are presented.

As for the study case, the Alberto Pasqualini refinery (REFAP) belonging to the Petrobras system was used, and 5 oil scenarios were selected. One scenario can be characterized by the knowledge of the inventory information in tanks and pipelines, loads of the process units, limitations of operations and schedule of oil receipt at zero hour of the referred days in the refinery.

Starting from this initial information, each scenario was tested 30 times. In the present description, a round means the execution of all the modules that comprise this invention as described above.

The solution presented at the end of each round was submitted to evaluation by using performance criteria, which are: total time of operation of distillation units and complete unloading of ships of oil within the window of time initially determined.

For each scenario, it has been calculated the percentage of rounds that have generated solutions adopted according to the performance criteria. As a result, the operation time of the units was more than 98% of the total time of the scenario and the delay in the unloading of ships was less than the total of 3 hours. The percentage of approved solutions of the 30 rounds was respectively:

Scenario 1→63.3%;
Scenario 2→96.7%;
Scenario 3→56.7%;
Scenario 4→23.3%;
Scenario 5→26.7%.

Thus, the present invention provides a method and an optimization system based on genetic programming with quantic inspiration using a domain specific language for the solution of programming problems, providing an adequate and efficient solution for the oil programming in refineries and effectively connected to operational reality.

Numerous variations focused on the scope of protection of the present patent application are allowed. In this way, it is emphasized the fact that this invention is not limited to the particular configurations/embodiments described above.

The invention claimed is:

1. An oil programming optimization method in a refinery through linear genetic grammar-oriented programming and with quantic inspiration, the method comprising:
   observing, in a genetic programming module, a quantic population comprising a plurality of quantic individuals, in which each quantic individual of the plurality of quantic individuals has a probability distribution representing oil programming solutions;
   through an interpretation of a grammar created from domain specific language, generating a classical population comprising a plurality of classical individuals from the plurality of quantic individuals, wherein each classical individual of the plurality of classical individuals includes a list of instructions for oil programming activities;
   running, in a simulation module, the list of instructions for oil programming activities in at least one iteration;
   verifying, in a constraints module, if each instruction of the list of instructions meets predetermined limits of refinery operation;
   creating, in a solution building module, a plurality of oil programming objects, comprising instructions for oil programming activities selected from a result of the running and the verifying, wherein each oil programming object is created from a corresponding classical individual of the plurality of classical individuals;
   evaluating, in a goals module, the plurality of oil programming objects according to predetermined criteria of refinery operation goals; and
   selecting at least one oil programming object;
   wherein:
      in response to a predetermined stop criterion being reached, the selected at least one oil programming object comprises an oil programming object evaluated and ranked as a best solution among the plurality of oil programming objects; and
      in response to a predetermined stop criterion not being reached the selected at least one oil programming object comprises
         a predetermined number of oil programming objects assessed and ranked as best solutions among the plurality of oil programming objects,
         and the method further comprises changing the probability distribution according to a classification of the selected at least one oil programming object through a quantic operator, and performing the observing, the generating, the running, the verifying, the creating, and the selecting in a new iteration based on the changed probability distribution.

2. The method according to claim 1, wherein the running comprises running each of the instructions for oil programming activities linearly and cyclically until a full scanning of individual results in the execution of no instruction.

3. The method according to claim 1, wherein the predetermined limits of refinery operation are associated with at least one operation time, quality of composition, oil volume, and composition volume.

4. The method according to claim 1, wherein the evaluating comprises evaluating and ranking each of the plurality of oil programming objects generated from the plurality of classical individuals in a current iteration along with oil programming objects resulting from a previous iteration.

5. The method according to claim 4, wherein the predetermined criteria of refinery operation goals are associated with prioritization of some activities with respect to other activities.

6. The method according to claim 1, wherein the method further comprises restarting the quantic population and classical population, and persisting best classical individual of the classical population, in response to the classical population converging so that an evaluation of all of the plurality classical individuals is equal.

7. A non-transitory computer-readable medium configured to store instructions which, when executed by a processor, cause the processor to perform the method of claim 1.

8. The method of claim 1, wherein the oil programming activities include at least one from among a definition of campaign and load flow of units, receiving and sending items, transfers relating to equipment, preparation and circulation of products in tanks; and maintenance of the equipment.

9. An oil programming optimization system in a refinery through linear genetic programming oriented to grammar and with quantic inspiration, the system comprising:
a genetic programming module configured to observe a quantic population comprising a plurality of quantic individuals, in which each quantic individual of the plurality of quantic individuals has a probability distribution representing oil programming solutions, and through an interpretation of a grammar created from domain specific language, to generate a population comprising a plurality of classical individuals from the plurality of quantic individuals, wherein each classical individual of the plurality of classical individuals includes a list of instructions for oil programming activities;
a simulation module configured to perform the list of instructions for oil programming activities in at least one iteration;
a constraints module configured to verify if each instruction of the list of instructions meets predetermined limits of refinery operation;
a solution building module configured to create a plurality of oil programming objects comprising instructions for oil programming activities selected from a result provided by the simulation module and the constraints module, wherein each oil programming object is created from corresponding classical individual of the plurality of classical individuals;
a goals module configured to evaluate the plurality of oil programming objects according to predetermined criteria of refinery operation goals, and to select at least one oil programming object;
wherein:
in response to a predetermined stop criterion being reached, the selected at least one oil programming object comprises an oil programming object evaluated and ranked as being a best solution among the plurality of oil programming objects; and
in response to a predetermined stop criterion not being met, the selected at least one oil programming object comprises
a predetermined amount of oil programming objects assessed and ranked as best solutions among the plurality of oil programming objects, and the goals module is further configured to
change the probability distribution of each of the quantic individuals to be observed by the genetic programming module in a new iteration according a classification of the selected at least one oil programming object through a quantic operator.

10. The system according to claim 9, wherein the simulation module is further configured to run each of the instructions for oil programming activities linearly and cyclically until a full scan of individual results in an execution of any instruction.

11. The system according to claim 9, wherein the predetermined limits of refinery operation are associated with at least one of operation time, quality of composition, oil volume and composition volume.

12. The system according to claim 9, wherein the goals module is further configured to evaluate and rank each of the plurality of oil programming objects generated from the plurality of classical individuals in a current iteration along with oil programming objects resulting from a previous iteration.

13. The system according to claim 9, wherein the predetermined criteria of refinery operation goals are associated with prioritization of some activities with respect to other activities.

* * * * *